United States Patent [19]

Nordmann

[11] 4,217,606
[45] Aug. 12, 1980

[54] OPTICAL MONITORING FACILITY AND THE METHOD FOR USING IT

[76] Inventor: Kurt Nordmann, Engimattstrasse 20, Zürich, Switzerland

[21] Appl. No.: 12,177

[22] Filed: Feb. 14, 1979

[30] Foreign Application Priority Data

Feb. 17, 1978 [CH] Switzerland .................. 1772/78
Nov. 21, 1978 [DE] Fed. Rep. of Germany ...... 2850419

[51] Int. Cl.² ............... H04N 7/18; G03B 17/02; G03B 21/00
[52] U.S. Cl. .................. 358/108; 358/210; 358/229; 352/242; 352/243
[58] Field of Search .............. 358/108, 229, 210; 352/242, 243; 354/69, 94, 174, 293

[56] References Cited

U.S. PATENT DOCUMENTS

| | | | |
|---|---|---|---|
| 3,535,442 | 10/1970 | Jennings | 358/108 |
| 3,732,368 | 5/1973 | Mahlab | 358/108 |
| 4,080,629 | 3/1978 | Hammomd et al. | 358/108 |
| 4,120,004 | 10/1978 | Coutta | 358/108 |

*Primary Examiner*—Robert L. Griffin
*Assistant Examiner*—Edward L. Coles
*Attorney, Agent, or Firm*—Ladas & Parry

[57] ABSTRACT

The apparatus for optical monitoring facility, wherein two circular elements are swivel-mounted at a support section. A television camera is fixed inside the first circular element, whereas the second circular element carries two dummy lenses. The apparatus is installed in a cover by which only the camera lens and the dummy lenses can be seen from the outside. The first circular element can be swivelled by a swivel motor, whereas the second circular element is swivelled in the same way by means of cables. The apparatus can be rotated around its vertically fixing axis by a motor. A control equipment allows the adjustment of the camera lens and of the camera's position. The control equipment comprises a programmable microprocessor in which an observation's sequence can be stored. The apparatus is arranged in such a way that the observation through only one lens cannot be recognized from the outside world.

17 Claims, 4 Drawing Figures

OPTICAL MONITORING FACILITY AND THE METHOD FOR USING IT

BACKGROUND OF THE INVENTION

The invention is concerned with an optical monitoring facility, turnable around at least one axis, comprising a camera with at least one real lens and comprising at least one dummy lens, and an equipment for the camera and movement control.

DESCRIPTION OF THE PRIOR ART

The known facilities of this kind, used most of all in self-service salesrooms have, as shown for example in Swiss Pat. No. 504,742, fixedly mounted lenses or dummy lenses on a camera container. The lenses or the dummy lenses have been arranged in such a way that a potential thief could not recognize through which one of the lenses the salesroom was just observed. Although only one camera which glanced over the whole salesroom was installed, a discouragement effect was achieved; all the more as it was no longer necessary to put the monitoring facility in a hiding place.

However, the monitoring facilities used up to now have different disadvantages. The fixedly mounted lenses or the dummy lenses on the camera container could certainly enhance the discouragement effect, as mentioned previously, but they reduced the viewing area. If the facility was fixedly mounted, it was only possible to observe roughly the most part of the room through a wide-angle lense under a fixed viewing angle or to have accurate control over a particular narrowly restricted sector of the room through the appropriate lenses. Also the use of turnable facilities of this kind could not much improve the monitoring effect.

A relatively large amount of the dummy lenses have had to be mounted on the camera container to simulate an uninterrupted monitoring of the whole room to the potential thief, which, however, could call the thief's attention to the simulated monitoring. Particularly the attention of a carefully observing thief, maybe a staff member, could be attracted and induce him to find out through which lens the room was observed. This was even much easier in the case of fixedly mounted lenses or dummy lenses.

SUMMARY OF THE INVENTION

It is an object of this invention to eliminate these disadvantages.

This will be obtained by the invention in that the camera lens and the dummy lens will be movably arranged relative to each other.

DETAILED DESCRIPTION OF THE PREFERRED EMBODIMENT

Figure 4:
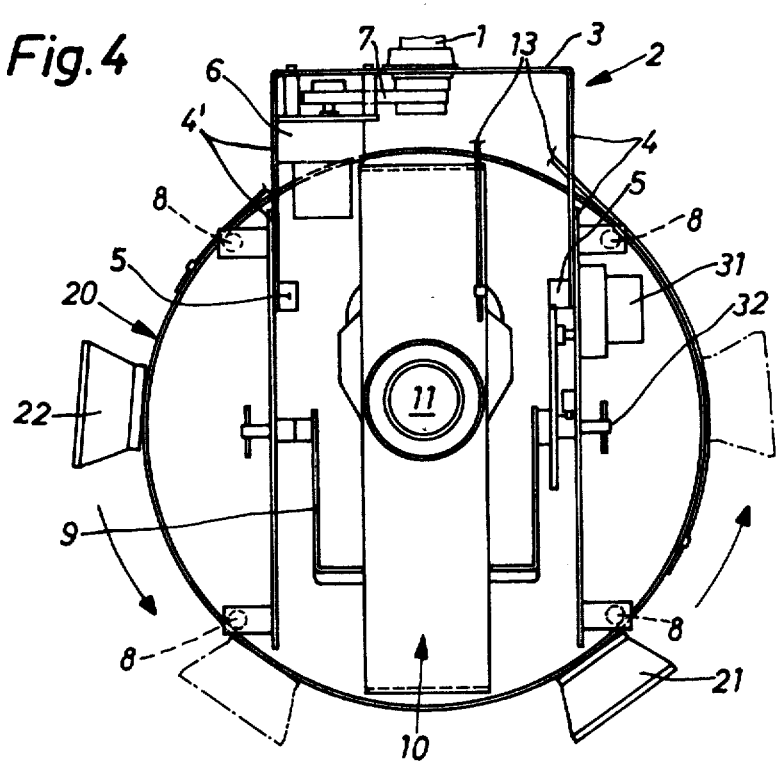
FIG. 4 is a frontal view of the equipment without covering.

The equipment comprises two circular elements 10, 20 which are swivel-mounted in a support section 2. The support section 2 is pivoted to a fixing axis 1 by which the equipment can be fixed on the ceiling of the room to be controlled. A motor 6 mounted on the support section 2 provides through a transmission belt 7 the rotation of the equipment. The supporting section 2 comprises a horizontal base-plate 3 and two vertically projecting elements 4, 4' supporting first rolls 8 on which the circular element 20 as well as a crossbar 9 are mounted, whereby the crossbar 9 carries a television camera 30. The crossbar 9 and a circular element 10 are fixedly connected through a bridge 15 and can be turned around an axis of swivel 32 by a swivel motor 31. The lens 11 of the television camera 30 is piercing the circular element 10 towards the outside. A dummy lens 12 is mounted on the same circular element 10 in an angle of about 130° relative to the lens 11 as can be particularly seen in FIG. 4. The appearance of the dummy lens 12 is exactly the same as that one of lens 11 so that after the equipment is covered, it will no longer be possible to distinguish these lenses.

Figure 1:
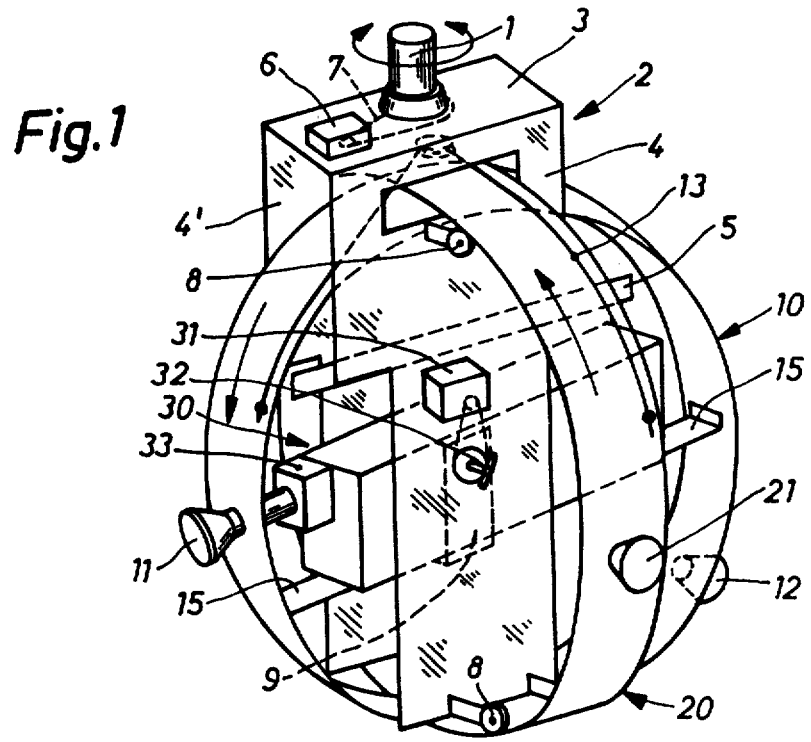
FIG. 1 is a drawing of the equipment without covering.

The circular elements 10, 20 are connected by means of two cables 13, 14. However, only one such cable 13 is shown in FIG. 1 for better discernment; but it is obvious that the second cable 14 is correspondingly provided, because cables can only take up pulling action. The cables 13, 14 can be protected against side-slip by a guidance arrangement (not shown in the drawings). Lowering the front part of the camera 30 down, as shown in FIG. 1 on the circular element 10 with an arrow, causes a counter-clockwise movement of the circular element 10. Also the circular element 20 will be turned in the counterclockwise direction. The dummy lenses 21, 22, which are fixed at the circular element 20 and cannot be distinguished visually from lens 11, will also be moved accordingly (see arrows in FIG. 4). Lowering the lens 11 of the camera 30 down causes the same movement of the dummy lens 22 and an opposite movement of the dummy lenses 12 and 21.

The equipment is fixed by a holder 5 inside of a cover 40, 40' which has regularly distributed slits through which the lens 11 and the dummy lenses 12, 21, 22 are looking outside. The circular elements 10, 20 are used moreover as shutters which make any insight into the interior of the equipment impossible.

Figure 2:
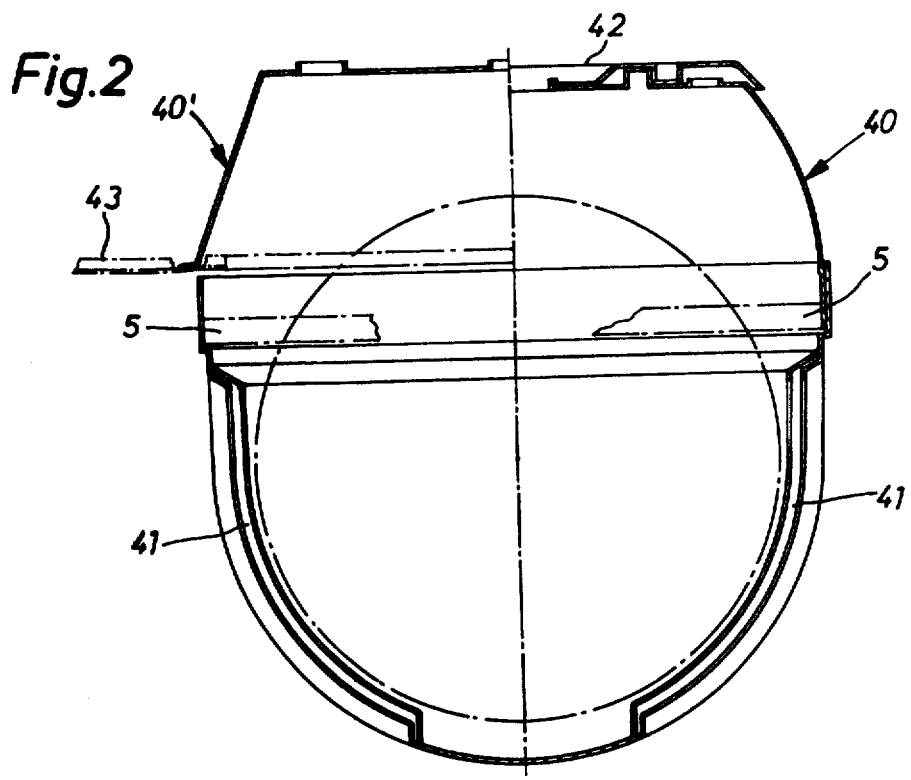
FIG. 2 is a sectional drawing through the swivel-plane of camera's cover in two realizations.

Two possible and different realizations of the cover are shown simultaneously in FIG. 2. The right side of FIG. 2 shows the cover realization 40 whereby the equipment is fixed under a ceiling 42. The left side of FIG. 2 shows another cover realization 40' where the equipment is partially inserted into the ceiling 43. Both realizations allow the use of the same equipment.

The cover 40, 40' is formed in a way that from its outside no conclusion can be drawn about the true position of the camera 30.

As it comes out from the foregoing, the camera 30 can be on the one hand turned around the fixing axis 1 by 360° and on the other hand swiveled around the axis 32 with the angle of about 60°, whereby the highest position is approximately 5° over the horizontal line. Hence it follows, that besides the salesroom also its ceiling and thereby the entire room can be optically controlled by the monitoring facility which can be particularly useful for the detection of possible fire sources.

Figure 3:
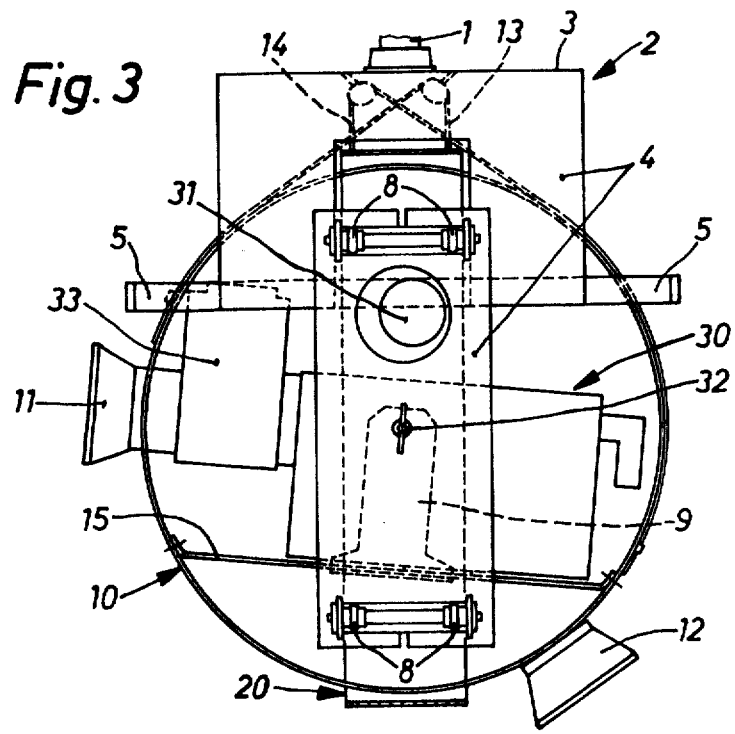
FIG. 3 is a side view of the equipment without covering, whereby a part of the equipment is removed.

The camera 30 comprises a device 33 (FIG. 1 or 3) for the continuous adjustment of the focal length, diaphragm, and sharp focusing of its zoom-lens. This device 33 allows a rough observation of the most part of the salesroom as well as an accurate control of a particular narrow restricted sector, for example a stand, a cashdesk, an exit, mirrors, and so on. The device 33 is designed to work with an ordinary hand-adjustable camera lens. To do that, toothed rings are connected to each adjustable ring of the camera lens whereby the toothed rings fix into gear-drives (not shown in the drawings). There are two electromotors provided for the drive of the focal length and detail adjustment with the gear-drive at each axis. Both electromotors are fixed in a mounting which is removably attached to the camera lens. This has the advantage that the lens can be easily changed, that the ordinary parts can be used, and that the gear-drive of the lens needs only small room to fix in. The camera 30 is connected to a monitor (not shown in the drawings) which is placed in an observation room.

The observer operates the monitoring facility by using a control equipment (not shown in the drawings). The control equipment contains preferably a programmable microprocessor (not shown in the drawings) in which the control programs of the favorite observation modes can be stored. The automatic observation modes can be interrupted and alternate with the hand control of all camera functions which may be used in the case of visually following a suspicious person or a person recognized as a thief.

The camera can be switched on, switched off, automatically or by hand turned to the left or to the right, and swivelled up or down by the control equipment. The focal length and the sharp focusing can be also changed. Two different speeds can be used for the rotation of the whole equipment. The first speed is chosen in that way, that observation is still possible with an appropriate adjustment of the camera lens 11 during the rotation, whereas the second speed is used for a quick adjustment of the camera to a particular direction of the observation. The control equipment fixes the lens to a larger field of view and keeps the camera swiveled slightly downwards during the automatic rotation in order to protect the monitor against the bright light coming from the ceiling illumination thereby enhancing the lifetime of the camera.

The use of the microprocessor allows the coordination of the described functions and the fixing of the observation movements to the given reality of each room. It is particularly possible to use the monitoring facility together with mirrors mounted in the room to be monitored. One observation cycle can contain, for example, a quick swivelling of the camera to a mirror, the automatic adjustment of a field detail according to the mirror, monitoring during 10 seconds in this particular position, swivelling to another mirror after the viewing area was widened and this second mirror once more automatically focused, holding the position for a while, swivelling to the cash register, and so on.

The invention of the monitoring facility, as has been shown by the above description, has many technical advantages compared with the known equipments.

The swivelling of the camera together with a rotation of the entire equipment allows a complete observation of a room. Because of the ability to swivel the camera and to aim at mirrors, the monitoring facility is in the position to take an optical control over a likely "dead grounds" of the room as perhaps places not directly optically accessible by the equipment. The dummy lenses are moved in the same manner as the camera lens in order to make the distinction between the working and dummy lenses impossible also if anyone assumes that not all of the four lenses are used for the observation. The invention increases on the one hand the margin of the observed room many times over in comparison with the known solutions and enhances on the other hand the discouragment effect to a potential thief who feels himself to be observed and who cannot find out the true observation movement of the camera from the outside.

While there are shown and described present preferred embodiments of the invention, it is to be distinctly understood that the invention is not limited thereto, but may be otherwise variously embodied and practiced within the scope of the following claims. Accordingly,

What is claimed is:

1. Apparatus for optical monitoring, comprising:
camera means;
camera lens means;
dummy lenses means;
control equipment means;
fixing axis means; the apparatus being rotatable around said fixing axis means, said camera means being optically connected with the camera lens means, said control equipment means regulating said camera and movement functions of the apparatus and said camera lens means and
dummy lens means being movable relative to each other.

2. The apparatus of claim 1, wherein said camera lens means can be swivelled in a first plane going through said fixing axis and said dummy lens means can be swivelled in a second plane going through said fixing axis and crossing said first plane in an approximately right angle.

3. The apparatus of claim 2, wherein at least one more dummy lens is mounted in each of said swivel-planes and can be swivelled there.

4. The apparatus of claim 2, wherein said camera means is fixed within said first circular element which can be swivelled around its axis, said dummy lens means being fixed at said second circular element which has a different radius from the first one, said swivel-axes of both circular elements crossing each other in an approximately right angle, said cover containing both circular elements in such a way that said camera lens means and said dummy lens means cannot be distinguished from the outside.

5. The apparatus of claim 4 having between said dummy lenses or between said dummy lens and said camera lens, wherein each pair is mounted on the same said circular element, an angle of 90° to 135°.

6. The apparatus of claim 4, wherein said first circular element is moved by said swivel-motor, said second circular element is mechanically coupled with said first circular element by means of said cables in order to carry out approximately the same movement as said first circular element.

7. The apparatus of claim 4, wherein both said circular elements are swivel-mounted at said support section.

8. The apparatus of claim 7, wherein said motor is mounted at said support section in order to rotate the apparatus around said fixing axis.

9. The apparatus of claim 8, wherein said motor has at least two rotation speeds.

10. The apparatus of claim 1, wherein said camera lens consists of a zoom-lens with variable focal length.

11. The apparatus of claim 1, wherein said camera means comprises a television camera.

12. The apparatus of claim 10, wherein said control equipment means regulates the rotation of the apparatus, the swivel-movement of said camera lens and said dummy lenses, and said variable focal length with said detail focusing of said zoom-lens.

13. The apparatus of claim 12, wherein said control equipment means contains said programmable microprocessor.

14. The use of the apparatus of claim 13 for the observation of a room, wherein a mirror is mounted at least at one place of the room, said control equipment means regulating said camera lens into the direction of said mirror and adjusting said focal length with said detail focusing of said zoom-lens in order to observe the room.

15. The apparatus of claim 10, wherein said camera zoom-lens contains adjustable rings for the continuous adjustment of said focal length and said detail focusing, whereby said adjustable rings can be rotated by said gear-drives of said electromotors.

16. The apparatus of claim 15, wherein said electromotors are fixed in said mounting which is removably attached to said adjustable rings of said camera lens.

17. The apparatus of claim 1, wherein said camera lens means is mechanically coupled to said dummy lens means.

* * * * *